Feb. 7, 1956 R. S. DAHMER 2,733,489
MACHINE FOR MAKING SHELL MOLDS
Filed May 9, 1952 3 Sheets-Sheet 2

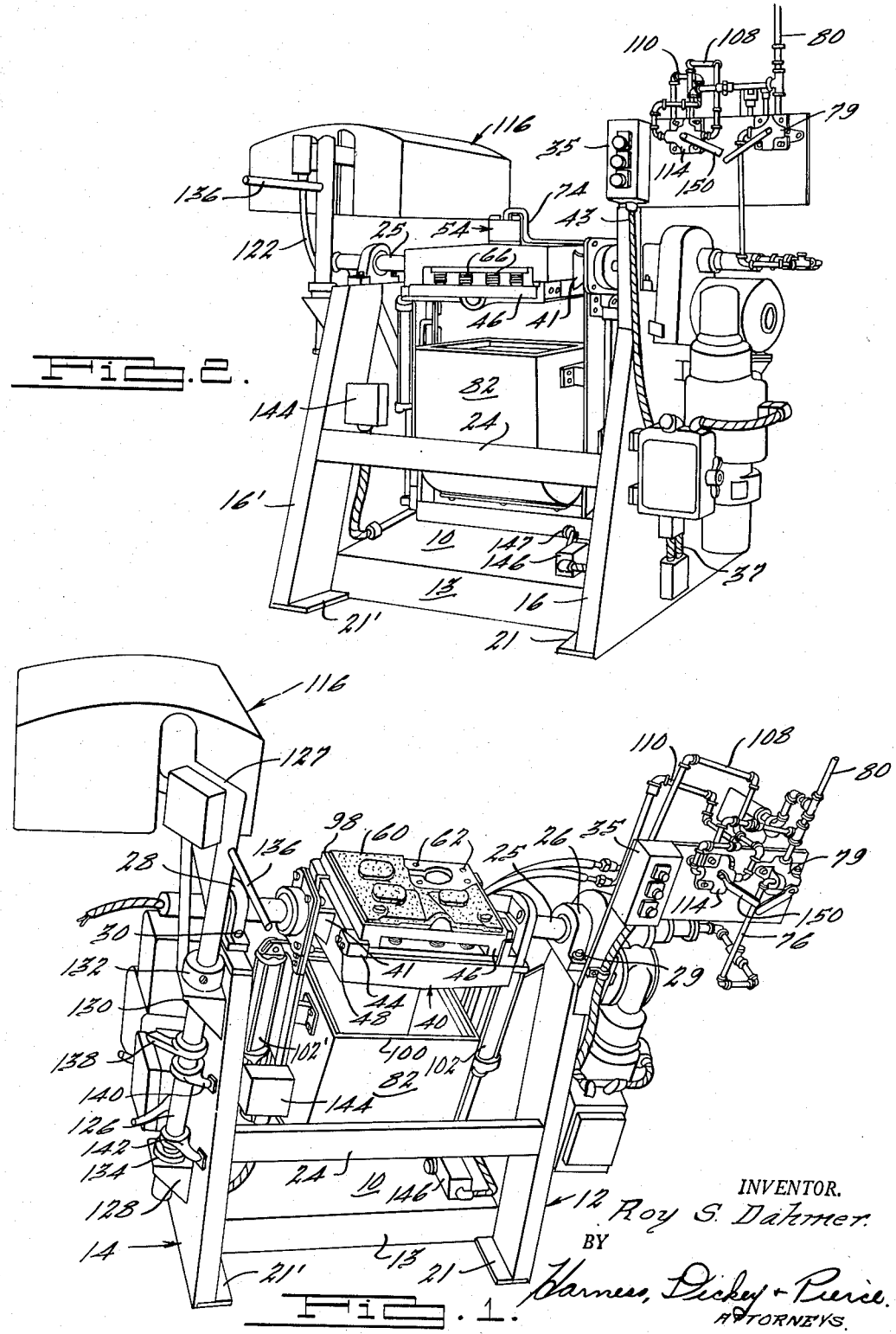

INVENTOR.
Roy S. Dahmer
BY
Harness, Dickey & Pierce
ATTORNEYS.

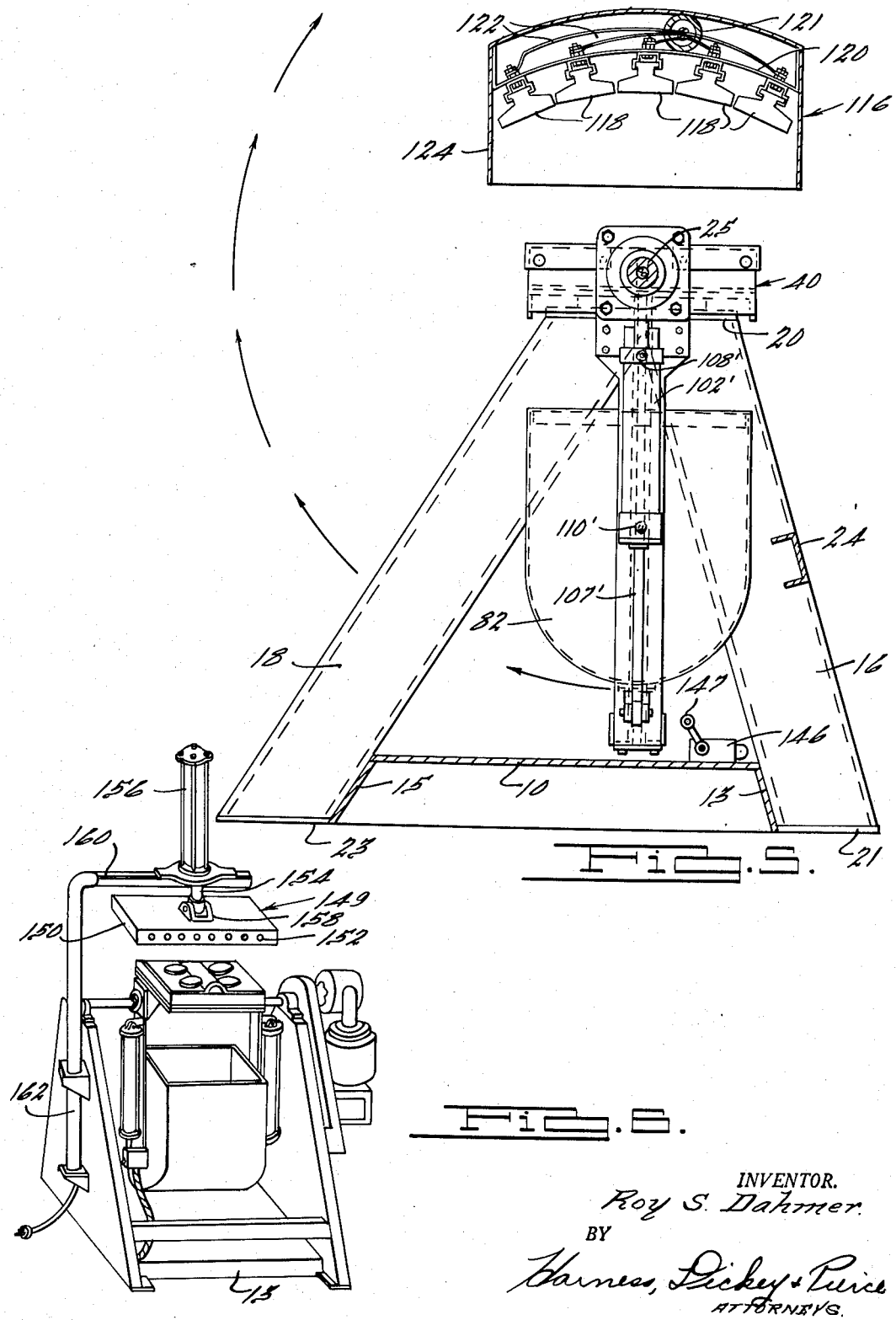

United States Patent Office 2,733,489
Patented Feb. 7, 1956

2,733,489

MACHINE FOR MAKING SHELL MOLDS

Roy S. Dahmer, Vassar, Mich., assignor to Eaton Manufacturing Company, Cleveland, Ohio, a corporation of Ohio Application May 9, 1952, Serial No. 286,909

9 Claims. (Cl. 22—33)

This invention relates to a method and a machine for making foundry shell molds and more particularly relates to an improved method and apparatus suitable for mass scale production of shell molds which are characterized by relatively thin wall thickness. The principal objects of the present invention are to provide an improved method for making shell molds and a machine capable of performing the method which is simple in construction, relatively inexpensive, efficient, durable and reliable in operation and which enables rapid quantity production of shell molds at a minimum of expense.

In the accomplishment of these objects, the present invention provides a machine having a pattern positioned in a pattern cradle mounted on a rotatable shaft, a molding material container suspended from the pattern cradle shaft and movable relative to the pattern to form therewith an integral rotatable unit, and laterally displaceable heating means which may be positioned over the pattern as desired. A further object of the present invention is to provide means for controlling the operative connection between the source of power and the rotatable cradle shaft so that the shaft may not be rotated when the heating means is positioned above the pattern, said means including a manually operable member controlling the positioning of the heating element and provisions whereby the connection between the source of power and the cradle shaft are re-established in response to the lateral disposition of the heating element relative to the pattern.

Another object is to provide means for automatically ejecting molds from the pattern face after the mold has been properly cured. In the present invention this is accomplished by ejector pins extending through the pattern body which are simultaneously actuated by a plate actuating device forcing the pins through the pattern and raising the cured shell mold from the pattern surface.

A still further object of this invention is to provide a method for making shell molds featuring an improved final curing procedure and a modified method capable of simultaneously curing and providing the shell mold with a smooth rear surface and a uniform wall thickness over all portions of the mold including the irregularly shaped recessed or projecting portions. Exemplifying one satisfactory means for accomplishing this object, the present invention provides a vertically and laterally movable heated platen which is positionable over the pattern, the platen having its mold contact surface shaped to mate with the pattern surface with due allowance in the surface configuration for the desired thickness of the shell mold.

In general, the method of this invention comprises the steps of uniformly admixing silica sand with a small quantity of a thermosetting resin, investing this sand-resin mixture on the formed surface of a heated pattern, maintaining an excess of the mixture on the heated pattern for a time sufficient to form a thin, adherent layer of the sand-resin mixture in a partially polymerized state on the pattern surface, removing the excess sand-resin mixture, applying additional heat to the partially polymerized layer, usually by external means, to completely cure and harden the layer into a unitary shell mold, and thereafter removing the cured shell mold from the pattern.

Conventional foundry sands having AFS fineness of about 95 to 150 and preferably about AFS fineness 90 to 120, may be used. Both substantially pure silica sand or silica sands containing upwards of 1% clay content within the above given fineness range, have been used successfully. The particular thermosetting resin which may be employed is not critical for the purposes of this invention and may be any phenol-aldehyde type resin such as the common phenolformaldehyde resins which contain a slight excess of unreacted phenol but which nevertheless have been sufficiently reacted to be in a solid and preferably powdered form. Such phenolformaldehyde resins may be conventionally admixed with the foundry sand in conventional mixing equipment such as a tumbler, a paddle mixer or a muller. Inasmuch as powdered resins of the above type present some dusting difficulties in the mixing operation, it is preferred that the sand be first treated with a small quantity of a wetting agent such as a petroleum hydrocarbon, for example, kerosene, solvent naphtha or other high boiling petroleum hydrocarbon. The wetting agent may be conventionally applied to the foundry sand by spraying against the sand after the mixing apparatus is in operation. The desired quantity of resin is preferably added to the sand after the wetting agent has been incorporated therewith. The proportion of thermosetting resin which is employed varies with the particular application inasmuch as the strength of the cured shell mold is partially dependent upon the proportion of resin which is present. For the majority of applications the resin content may vary between about 3½% to 10% by weight of the sand-resin mixture. It will be appreciated that the quantity of resin employed for any particular application should closely approximate the minimum which is required to impart the necessary strength, and proportions of resin between about 3½% to 7% by weight have usually been found to be adequate. With the proper proportion of resin added to the sand, uniform admixture may be obtained in a short period of time, for example, 20 to 60 minutes.

The resin-sand mixture is positioned on the formed surface of a heated pattern having the desired configuration. The pattern temperature may vary over a rather wide range, for example, from about 350° F. to 450° F. and the particular temperature selected within this range is dependent upon the desired wall thickness of the shell mold to be formed and the particular resin being used. Routine experimentation under operating conditions will quickly determine the best temperature to be used. The sand-resin mixture is dumped or otherwise positioned on the pattern surface in excess of that required to form the shell mold. The entire quantity of sand-resin mixture is maintained on the heated pattern surface for a time sufficient to soften the resin constituents of the mixture to form an adherent layer on the pattern surface having the desired thickness. The time required for this adherent layer formation may vary, for example, between about 6 to 30 seconds to form a ⁹⁄₁₆ inch thick layer when using materials of the above described type. It will be understood that the thickness of the layer or the wall thickness of the shell mold will be dependent upon the time which the excess sand is maintained on the pattern surface and that proportionately greater times will be required in order to form thicker layers. After the soft semi-cured layer of the desired thickness has been formed on the pattern surface, the excess sand-resin mixture is removed, for example, by inverting the pattern and the adherent layer is thereafter completely cured to a hard, strong state. Final curing may be accomplished by merely raising the temperature of the pattern within the range of 500° F. to 1000° F. or by positioning the pattern in a heated furnace maintained at comparable temperatures, but for the purposes of this invention, it is preferred that the rear surface of the semi-cured layer on the pattern surface be finally cured by heating the same with infrared rays. It has been found that extremely rapid and uniform curing may be obtained by supplying the final curing heat from a bank of infrared lamps, equipped with the proper reflectors, in a relatively short period of time, for example, between fifteen seconds and about 15 minutes. Molds having wall thickness up to about 3/16" may usually be cured in 3 minutes or less. With such heating means, it is relatively easy to obtain temperatures as high as 1000° F. within the layer. This type of heating has the advantage of penetrating the semi-curved layer uniformly throughout and produces a uniformly cured, strong shell mold having little tendency to warp during the curing operation. After curing, the shell mold is complete and may be removed from the pattern surface by means of ejector pins penetrating the pattern body and abutting the surface of the shell mold adjacent to the pattern surface. In the quantity production of shell molds in accordance with the method of this invention, it is usually necessary to remove the shell mold while it is still hot and it is preferred that the hot shell mold be positioned on a supporting frame to eliminate warpage during the cooling of the shell mold.

For the purpose of preventing sticking of the shell mold to the pattern surface, it is desirable to treat the upper surface of the pattern with a release agent or lubricant which will facilitate the separation. A variety of materials may be used for this purpose such as paraffin or other high temperature melting waxes, but high temperature resistant silicones in the form of greases or water emulsions of such greases have been found to be somewhat superior for this purpose. A thin layer of such a silicone grease or water emulsion of the silicone grease may be applied to the pattern surface before each investment, or as often as is required to prevent the shell from sticking to the pattern. In beginning the use of a new pattern, it is desirable to treat the pattern surface with an excess of release agent and to heat the pattern with the release agent thereon for an extended period of time, for example, two or more hours. It is even more desirable to heat the pattern at 400° F. for two hours and alternately cool the same a number of times before the initial investment is made.

Illustrative means for carrying out the above described method are shown in the accompanying drawings wherein:

Figure 1 is a perspective view of a machine embodying the principal features of the invention;

Fig. 2 is a perspective view of the machine of Fig. 1 illustrating the pattern after rotating 180°;

Fig. 5 is a sectional view of the device illustrated in Fig. 3 taken along the line 5—5 thereof and looking in the direction of the arrows; and Fig. 6 is a perspective view of a machine of the type illustrated in Fig. 1 and showing a modification thereof.

Figure 3:
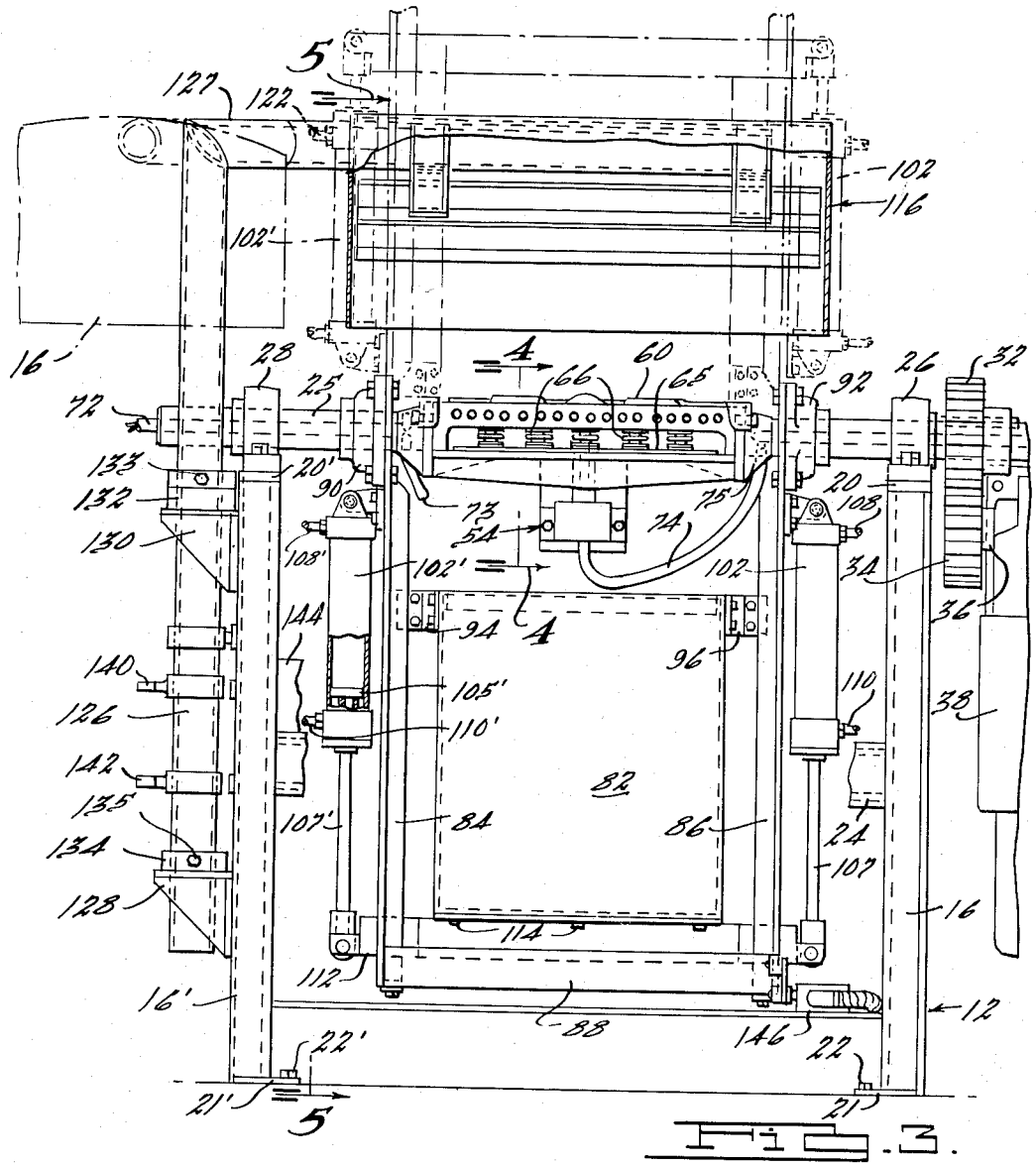
Fig. 3 is a view of the machine of Fig. 1 partly in elevation and partly in section with certain parts broken away to illustrate varying positions of the container and heating means.

A machine which illustrates one means of performing the method of this invention is comprised of a supporting base having upwardly extending end frames, a pattern cradle mounted on a rotatable shaft supported by the end frames and revolved by reversible driving means, a container carried by a freely swinging frame suspended from the pattern cradle shaft, means for moving the container relative to the pattern cradle, external means for selectively applying heat to the pattern cradle area and associated control means for preventing rotation of the shaft when the heating means lies in the path of revolution of the container as will be hereinafter more fully discussed.

Referring more specifically to the drawings, there is illustrated a machine of the above described general type having a horizontally disposed base plate 10 and a pair of spaced vertically disposed generally triangular shaped end frame sections 12, 14 secured to plate 10 by abutting downwardly inclined flange portions 13, 15 as by welding or the like. As may be seen in Figs. 3 and 5, end frame section 12 is comprised of a pair of upwardly extending enclosed channel members 16, 18 which are angularly inclined toward each other and the upper portions of which abut and are rigidly secured by a plate 20 by suitable attachment means such as welding or the like. Opposed frame section 14 is similarly constructed and like parts bear correspondingly primed numbers. Channel members 16, 18 are provided with inwardly projecting toe flanges 21, 23 to enable the rigid clamping of the supporting base assembly to the floor or to another base upon which it is positioned as by bolts 22. A horizontally disposed channel member 24 is provided between upright frame sections 12, 14, to brace and strengthen the entire assembly.

Extending across the upper portions of frame sections 12, 14 and projecting outwardly beyond each is a horizontally disposed shaft 2 journaled for rotation in a pair of pillow block bearings 26, 28 carried by frames 12, 14 respectively, and rigidly secured to plates 20, 20' by suitable means such as bolts 29, 30. Shaft 25 is preferably hollow for reasons which will be explained more fully hereinafter and is reversibly revolved or driven by spur gearing 32 fast on shaft 25 and mating spur gearing 34 carried by the output shaft 36 of a conventional reversible direction gear head motor 38. Electric motor 38 is supplied with power by incoming power cable 37, and its operation is controlled by push button switch 35 interconnected therewith by cable 43.

Figure 4:
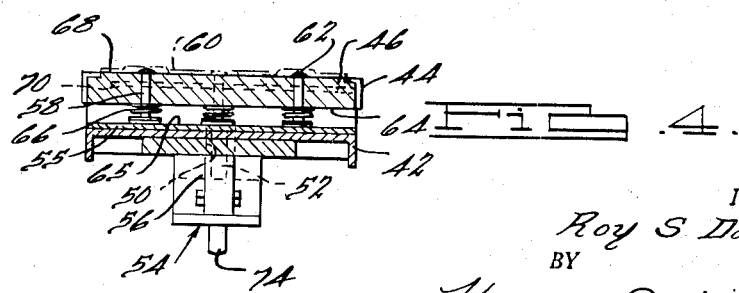
Fig. 4 is a sectional view of the pattern and pattern cradle taken along the line 4—4 of Fig. 3.

Pattern cradle 40 is rigidly mounted on cradle shaft 25 by outwardly projecting flange means 41 approximately medially between frame sections 12, 14. Pattern cradle 40 is comprised of a rectangular shaped bed section 42, having upwardly disposed flange pattern attachment means 44 disposed at each of the four corners thereof for releasably securing pattern 46 thereto. Pattern attachment means 44 are provided with adjustable set screws 48 for enabling the rigid securing and ready disassembly of the pattern 46 from the cradle bed 42. As may best be seen in Fig. 4, pattern cradle bed 42 is provided with a centrally disposed aperture 50 accommodating plunger rod 52 of a pin ejector means generally designated 54. Pin ejector means 54 is comprised of a horizontally disposed plate 55 rigidly secured to plunger rod 52 which is housed for oscillation in a surrounding cylinder 56 and is actuatable by air pressure or other suitable mechanical means. Horizontal plate 55 coacts with and actuates a plurality of ejector pins 58 which are selectively spaced over the surface of pattern 46 to enable the removal of the shell mold 60 from the pattern 46 without rupturing or fracturing the shell mold. It will be appreciated that the number and relative positioning of ejector pins 58 will vary with the particular shape of the mold being made, and that pins 58 should not be positioned any closer to the mold cavities than is necessary. An adequate number should be provided so that piercing and distortion of the mold may be avoided as plate 55 is raised. Ejector pins 58 are provided on their upper ends with an enlarged head portion 62 and project completely through pattern 46 and extend downwardly and into contact with the upper surface of actuator plate 55. Surrounding each ejector pin 58 and inserted between the lower surface 64 of pattern 46 and the upper surface 65 of actuator plate 55 are means for returning pins 58 to their initial position after plunger rod 52 has ceased to exert upward pressure, such as springs 66.

Pattern 46 may be formed from a variety of materials including copper alloys, steel, polished aluminum, polished gray iron or the like. High carbon irons are particularly suitable and are preferred because of their tendency to maintain an even heat over wide temperature variations. The upper surface 68 of pattern 46 is shaped or configured by conventional methods to provide thereon the required cavities or raised portions together with the pouring basin, downgate, runner, riser and alignment bosses to assure proper alignment of the cope and drag sections. For the purpose of enabling pattern 46 to be uniformly heated, a plurality of transversely extending apertures 70 are provided immediately below the configured pattern surface and fitted with suitable electrical resistance heating elements of conventional type which are suitably connected to a source of power. Inasmuch as pattern 46 rotates with shaft 25, electrical connecting means 72 is disposed within shaft 25 and is provided with a central linking portion 73 having sufficient length to form a connection with the heating means in the pattern. It will be appreciated, however, that the length of electrical cord 72 positioned within hollow shaft 25 allows the repetitive twisting of cable 72 for relatively long periods of time without danger of fatigue failure and interruption of production. An even temperature of the pattern surface is maintained by the use of a contact thermostat of conventional design mounted closely adjacent to the upper pattern surface. In a similar manner it will be understood that ejector pins actuating means 54 rotates with pattern cradle 40 and the air cylinder actuating means must therefore be provided with suitable air supply connecting means to enable its rotation without interruption of the source of supply of air. This is accomplished by supplying the air to air cylinder 56 by means of flexible hose 74 which enters hollow shaft 25 through an aperture 75 and projects outwardly therethrough and is connected to an air source 80 through piping 76 and manually controllable valve 79.

An open top container 82 is mounted on a freely swinging trunnion type frame having downwardly depending arms 84, 86 and a horizontally disposed cross bar 88. The upper ends of arms 84, 86 are rigidly attached to flange type bearings 90, 92, respectively, which are freely rotatable about cradle shaft 25. Container 82 is secured to arms 84, 86 by sliding brackets 94, 96, respectively. The shape of container 82 is not critical with the exception that the upper open end should have the shape of and correspond to the shape of pattern 46 to enable the nesting or positioning of container 82 on cooperating ledges or flats of pattern 46 to form an air-tight integral unit. As shown, pattern 46 is provided with a perimetral shoulder 98 which mates with and seals against the corresponding shoulder 100 of container 82, shoulder 100 preferably carrying a suitable gasket or sealing means such as neoprene or the like.

Vertical sliding motion of container 82 is obtained relative to arms 84, 86 by means of actuating means 102, 102'. Air cylinders 102, 102' are of conventional design having an outer wall cylinder and an internally reciprocative plunger 105, 105' integrally connected to plunger rods 107, 107', the plungers being actuatable by air supplied to the end extremities of the air cylinder through flexible connecting air hoses 108 and 110. The lower extremities of plunger rods 107, 107' are connected to a horizontally disposed cross-bar 112 upon which container 82 rests. Container 82 and cross-bar 112 are rigidly secured together at a plurality of points 114. Air cylinders 102, 102' are controlled by air valve 114 which is interposed between supply lines 108, 110 and compressed air source 80 and is manually controllable by the positioning of handle 150.

To enable the rapid final curing of the semi-cured resin-sand layer on the pattern surface, there is provided a positionable heating means generally designated 116. As may best be seen in Figure 5, heating means 116 is comprised of a plurality of heating elements or lamps 118 arranged in a horizontally disposed bank and depending from a concave supporting member 120. Lamps or heating elements 118 are preferably infrared lamps of conventional design. Lamps 118 are electrically connected to a source of power as by wiring 122 and unnecessary spreading of the heat radiating from lamps 118 is eliminated by surrounding shield 124. The entire heating means 116 is swingable about a revolving column 126 having a horizontally disposed upper supporting portion 127 directly connected to and forming the sole support for arcuately shaped supporting reflector 120. Vertically disposed revolvable column 126 is mounted for rotation in a pair of brackets 128, 130 and is vertically positionable relative to the pattern surface 60 by means of releasable collars 132, 134 having set screws 133, 135 to secure the column in the desired vertical position. Heating means 116 may be rotated manually by handle means 136 into a position directly over pattern surface 60 as may be seen in the full lines of Fig. 3, the revolution in this direction being controlled by stop 138. When not in use, heating means 116 is stored in the position indicated in Figs. 1 and 2, with the limit of motion in this direction being controlled by stops 140 and 142. In order to eliminate the possibility of rotation of cradle shaft 25 in the direction of the arrow as shown in Fig. 5 when heating means 116 is positioned above pattern surface 60, a breaker or safety switch 144 is physically positioned on frame 14 to be actuated by stop 140 and is located in the electrical connection between the power source and motor 38. At any time when stop 140 is out of contact with switch 144, the power circuit to motor 38 is open and may not be inadvertently actuated in a rearward direction. By this simple means, the possibility of unintentional rotation of cradle shaft 25 is eliminated.

Because of the presence of horizontally disposed strengthening channel 24, forward rotation of cradle shaft 25 is undesirable when container 82 is in its "at rest" position. In order to remove the possibility that the operator will energize motor 38 in the forward direction when the container 82 is down, limit switch 146 is provided with an outwardly projecting rockable arm 147, the deflection of which opens the power circuit to the motor 38, thereby preventing continued forward motion of container 82.

In the conventional use of shell molds formed in accordance with the process of this invention, the condition of the rearward surface of the mold is relatively unimportant and the desired objective may be obtained so long as the shell mold wall thickness is sufficient to provide the requisite strength to momentarily support the weight of the cast metal poured therein. For the purpose of enabling the casting in such shell molds, it has been suggested that the rearward surfaces of the cope and drag sections of the mold be supported by loose shot or the like positioned in a suitable container. The support of molds by the use of shot or equivalent means is undesirable inasmuch as expensive labor is required in the proper positioning of the shell mold in the shot filled container prior to each casting operation. Even with the use of supporting shot, certain size limitations of the articles to be cast have become apparent and it is desirable to more adequately support the rearward surface of the shell molds so that larger pieces may be cast therein. In order to enable continuous support over the entire rear surface area of the shell mold, it is necessary that the rearward surface of the shell mold be smooth and that the wall thickness of the shell mold be uniform over the entire surface area. As a means to enable the formation of smooth rearward surfaces and shell molds having uniform wall thickness, there is provided a modified final curing means which is illustrated in Fig. 6 and generally designated 149. The modified heating means 149 comprises a platen 150 having internally positioned resistance heating elements 152 and is rigidly attached to the movable plunger rod 154 of a conventional air cylinder 156 by suitable attachment means such as clevis type bracket 158. Air cylinder 156 is supported by a horizontally disposed arm 160 integral with rotatable vertically disposed column 162 mounted in a manner similar to that explained above in relation to column 126. The lower surface of platen 150 is preliminarily formed to contain recesses and projections corresponding to those of the pattern surface 68, the cavities and projections of platen 150 having due allowance for the thickness of the shell mold. After the semi-cured sand-resin layer is formed on the pattern, platen 150 is swung into position directly above the pattern and is lowered into position by the action of air cylinder 156. The downward motion of platen 150 and the subsequent pressure placed upon the shell mold, may be controlled by adjusting the height of vertical column 162 and the length of stroke of plunger rod 154 or by conventional bleeder means on air cylinder 156 to regulate the length of stroke of plunger rod 154. By suitable bleeding means the required pressure of platen 150 on the shell mold also may be suitably controlled. As explained above in connection with the method, the temperature of platen 150 may vary between about 500° F. and 1000° F. with the most desirable temperature being determined by a few simple experiments under operating conditions.

In the operation of the machine to form shell molds, the pattern 46 is initially in its upward position as shown in Fig. 1, and the first operation is to actuate motor 38 to invert pattern 46 to its downward position as is indicated in Fig. 2. Air valve 114 is then opened, feeding air under pressure through lines 110, 110' to the lower end of air cylinders 102, 102', thereby contracting plunger rods 107, 107' and raising container 82 until the upper surface 100 abuts perimetral ledge 98 and seals therewith to form an integral unit rotatable with cradle shaft 25. Motor 38 is then energized to rotate container 82 and pattern 46 in a rearward direction as indicated in Fig. 5 until the position indicated by the dotted lines in Fig. 3 is attained. Due to the rapid rotation of cradle shaft 25, the resin-sand mixture carried by container 82 is thereby forcefully dumped upon the upper heated surface 68 of the pattern 46. After the elapse of the previously established time, cradle shaft 25 is rotated in a reverse direction returning container 82 to its initial downward position, still however in integral contact with the face of pattern 46. Air cylinders 102, 102' are then actuated by admitting air under pressure through flexible hoses 108, 108' to the upper end thereof causing container 82 to break its seal with the perimetral ledge 98 and to assume its initial fully downwardly extended position. Pattern 46 is then rotated 180° so that its coated surface 68 faces upwardly. Heating means 116 is then manually swung into position directly over the partially cured adherent resin-sand layer and the concentrated infrared heat maintained thereon for the preliminarily determined required period of time after which heating means 116 is manually swung back to its original position. At this point, shell mold 60 is in its fully cured final state and in this state is removed from the surface of the pattern 46 by the manual opening of air valve 78 admitting air under pressure through hose 75 to cylinder 56 actuating plunger 52 upwardly raising ejector pins 58 above the pattern surface 68 and effectively uniformly lifting shell mold 60 from the surface. The shell mold is preferably placed upon a flat or planar surface to eliminate the possibility of warpage during cooling.

In order to form a complete shell mold, it will be understood that both cope and drag sections must be formed, and in some instances this may require the use of two separate patterns. It will be understood that the expressions cope and drag sections refer to the two halves of the shell mold which when disposed in a vertical plane are also denominated inner and outer sections. As indicated hereinabove, substitute patterns may be readily positioned on pattern cradle 42 and the cycle repeated for the cooperating cope or drag section.

What is claimed is:

1. In a machine for making shell molds, a base, a pair of spaced frames extending upwardly therefrom, a horizontally disposed shaft journaled for rotation in bearings carried by said spaced frames, means for reversibly revolving said shaft, a pattern cradle rigidly mounted on said shaft between said frames, a pattern removably mounted on said pattern cradle, a container having an open top portion, means attaching said container to said shaft, means for moving said container relative to said pattern for sealing said pattern and said container into an integral unit rotatable with said shaft, and heating means positionable over said pattern.

2. A machine as defined in claim 1, wherein said pattern is provided with a multiplicity of spaced ejector pins projecting therethrough, the upper ends thereof terminating in an enlarged head portion substantially flush with the configured surface of said pattern and the lower ends of said pins extending beyond the lower surface of said pattern and abutting a plate having actuating means connected thereto for projecting said pins above the said configured patterned surface and means carried by said pins to return them to their initial position.

3. In a machine for making shell molds, a base, a pair of spaced frames extending upwardly therefrom, a horizontally disposed shaft journaled for rotation in bearings carried by said spaced frames, means for reversibly revolving said shaft, a pattern cradle rigidly mounted on said shaft between said frames, a pattern removably mounted on said pattern cradle, means inserted in the said pattern for heating the pattern and means for maintaining the pattern temperature substantially constant, a container having an open top portion, bracket means attaching said container to said shaft, means for moving said container relative to said pattern for sealing said pattern and said container into an integral unit rotatable with said shaft and heating means positionable above said pattern.

4. In a machine for making shell molds, a base, a pair of spaced frames extending upwardly therefrom, a rigidly disposed shaft journaled for rotation in bearings carried by said spaced frames, means for reversibly revolving said shaft, a pattern cradle rigidly mounted on said shaft between said frames, a pattern removably mounted on said pattern cradle, means for heating and maintaining the temperature of said pattern substantially constant, a plurality of ejector pins projecting through the body of said pattern, the upper ends of said ejector pins terminating in an enlarged heat portion substantially flush with the configured surface of said pattern, the lower ends of said pins extending beneath the lower surface of said pattern into abutment with an actuating plate having means connected thereto for simultaneously moving said ejector pins through the body of said pattern and raising the enlarged head portions above the said configured pattern surface, spring means carried by said pins to return them to their initial position, a container carried by a bracket downwardly depending from said shaft and journaled for rotation thereabout, means carried by said bracket for moving said container relative to said pattern for sealing said pattern and said container into an integral unit rotatable with said shaft and heating means positionable above said pattern.

5. In a machine for making shell molds, a base, a pair of spaced frames extending upwardly therefrom, a rigidly disposed shaft journaled for rotation in bearings carried by said spaced frames, means for reversibly revolving said shaft, a pattern cradle rigidly mounted on said shaft between said frames, a pattern removably mounted on said pattern cradle, means for heating and maintaining the temperature of said pattern substantially constant, a plurality of ejector pins projecting through the body of said pattern, the upper ends of said ejector pins terminating in an enlarged head portion substantially flush with the configured surface of said pattern, the lower ends of said pins extending beneath the lower surface of said pattern into abutment with an actuating plate having air cylinder means connected thereto for simultaneously moving said ejector pins through the body of said pattern and raising the enlarged head portions above the said configured pattern surface, spring means carried by said pins to return them to their initial position, a container carried by a bracket downwardly depending from said shaft and journaled for rotation thereabout, air cylinder means carried by said bracket for moving said container relative to said pattern for sealing said pattern and said container into an integral unit rotatable with said shaft, and heating means positionable above said pattern.

6. In a machine for making shell molds, a base, a pair of spaced frames extending upwardly therefrom, a rigidly disposed shaft journaled for rotation in bearings carried by said spaced frames, means for reversibly revolving said shaft, a pattern cradle rigidly mounted on said shaft between said frames, a pattern removably mounted on said pattern cradle, means for heating and maintaining the temperature of said pattern substantially constant, a plurality of ejector pins projecting through the body of said pattern, the upper ends of said ejector pins terminating in an enlarged head portion substantially flush with the configured surface of said pattern, the lower ends of said pins extending beneath the lower surface of said pattern into abutment with an actuating plate having means connected thereto for simultaneously moving said ejector pins through the body of said pattern and raising the enlarged head portions above the said configured pattern surface, spring means carried by said pins to return them to their initial position, a container carried by a bracket downwardly depending from said shaft and journaled for rotation thereabout, means carried by said bracket for moving said container relative to said pattern for sealing said pattern and said container into an integral unit rotatable with said shaft and infra-red lamp heating means positionable above said pattern.

7. In a machine for making shell molds, a base, a pair of spaced frames extending upwardly therefrom, a rigidly disposed shaft journaled for rotation in bearings carried by said spaced frames, means for reversibly revolving said shaft, a pattern cradle rigidly mounted on said shaft between said frames, a pattern removably mounted on said pattern cradle, means for heating and maintaining the temperature of said pattern substantially constant, a plurality of ejector pins projecting through the body of said pattern, the upper ends of said ejector pins terminating in an enlarged head portion substantially flush with the configured surface of said pattern, the lower ends of said pins extending beneath the lower surface of said pattern into abutment with an actuating plate having means connected thereto for simultaneously moving said ejector pins through the body of said pattern and raising the enlarged head portions above the said configured pattern surface, spring means carried by said pins to return them to their initial position, a container carried by a bracket downwardly depending from said shaft and journaled for rotation thereabout, means carried by said bracket for moving said container relative to said pattern for sealing said pattern and said container into an integral unit rotatable with said shaft, and heating means including a bank of infra-red lamps and a reflecting shield mounted on a rotatable vertical column, means carried by said column disconnecting the shaft rotating means and the shaft when the said lamps are positioned above the said pattern.

8. In a machine for making shell molds, a base, a pair of spaced frames extending upwardly therefrom, a rigidly disposed shaft journaled for rotation in bearings carried by said spaced frames, means for reversibly revolving said shaft, a pattern cradle rigidly mounted on said shaft between said frames, a pattern removably mounted on said pattern cradle, means for heating and maintaining the temperature of said pattern substantially constant, a plurality of ejector pins projecting through the body of said pattern, the upper ends of said ejector pins terminating in an enlarged head portion substantially flush with the configured surface of said pattern, the lower ends of said pins extending beneath the lower surface of said pattern into abutment with an actuating plate having means connected thereto for simultaneously moving said ejector pins through the body of said pattern and raising the enlarged head portions above the said configured pattern surface, spring means carried by said pins to return them to their initial position, a container carried by a bracket downwardly depending from said shaft and journaled for rotation thereabout, means carried by said bracket for moving said container relative to said pattern to seal said pattern and said container into an integral unit rotatable with said shaft, and heating means for simultaneously curing a shell mold on said pattern and producing a shell mold having a uniform wall thickness and a smooth rear surface.

9. A machine as defined in claim 8 wherein the said heating means comprises a vertically movable platen having the surface thereof configured to conform to the surface configuration of the pattern, means for advancing the said platen toward the said pattern and for maintaining a constant pressure on the said platen and thereafter raising the platen away from the pattern surface, said platen containing internal heating means and temperature control means.

References Cited in the file of this patent

UNITED STATES PATENTS

| | | |
|---|---|---|
| 2,353,207 | Whittaker | July 11, 1944 |
| 2,367,648 | Nichols | Jan. 16, 1945 |
| 2,391,855 | Bean | Dec. 25, 1945 |
| 2,445,141 | Hardy | July 13, 1948 |
| 2,480,896 | Bean | Sept. 6, 1949 |
| 2,588,669 | Taccone | Mar. 11, 1952 |
| 2,659,945 | Valyi | Nov. 24, 1953 |

FOREIGN PATENTS

| | | |
|---|---|---|
| 832,934 | Germany | Mar. 3, 1952 |
| 832,936 | Germany | Mar. 3, 1952 |

OTHER REFERENCES

The Iron Age, April 19, 1951, pages 81–85.
The Foundry, October 1950, pages 162, 164 and 168.